United States Patent Office 2,868,648
Patented Jan. 13, 1959

2,868,648

PROCESSES OF PRODUCING A BAKED CEREAL PRODUCT

Georg Henning Blomqvist, Goteborg, and Arne Ivar Malm, Agnesberg, Sweden, assignors to P. O. Stokkebyes Kvarnaktiebolag, Goteborg, Sweden No Drawing. Application March 8, 1954
Serial No. 414,883

5 Claims. (Cl. 99—83)

The present invention relates to a process of producing a baked cereal product with long storage life and consisting to a considerable portion of oats.

In products of oats such as oat-flour, rolled oats, oat-flakes, oat-biscuits and similar products under certain circumstances bitter substances are formed giving such unpleasant taste to these products that they will be useless as human food. In this respect oats differ from other cereals.

Oats have a higher percentage of fat than the other ordinary cereals. Fat will become rancid in storage, and it has previously been assumed that the formation of bitter substances was due to the fat becoming rancid. The result of the investigation which have ended in the present invention indicates, however, that this is not the case.

Fat will become rancid substantially according to two different chemical reactions:

(1) Hydrolysis reaction forming free fatty acids. These reactions are formed generally by lipases, and the ill-tasting reaction products are substantially free fatty acids.

(2) Oxidation reactions in which glycerides in the fat or free fatty acids formed according to (1) are oxidized to ill-tasting products often by the co-operation of certain enzymes.

The formation of bitter substances in the oat-products obviously does not take place according to the reactions causing rancidity though said formation often runs parallel with the formation of free acids according to (1).

According to the investigations leading to the present invention the formation of bitter substances in oat-products seems to depend on the presence of certain complicated substances of a character similar to glucosides and which can be split by the co-operation of certain enzymes or in other way whereby bitter substances are formed some of which are somewhat volatile.

The conclusion can be drawn that the formation of the bitter substances in the oat-products is not caused by the ordinary reactions making fat rancid by the known fact that sometimes small quantities of oat-flour with good result are added to fat in order to prevent or retard the rancidity of the fat.

Some circumstances are previously known which retard or accelerate respectively the formation of bitter substances in oat-products. Thus, this will be retarded by steam preparation of the oats. On the other hand, the formation of bitter substances is accelerated by baking and/or toasting (as for instance in the production of oat-biscuits or toasted oat flakes or similar products), further by the presence of certain salts, such as common salt or small amounts of salts of certain heavy metals. Finally, addition of certain kinds of fats to the oats will accelerate the formation of bitter substances.

The present invention, however, relates to a process in the production of a baked and/or toasted cereal product consisting to a considerable portion of oats, characterized by the fact that cocoanut oil in an amount of 0.1–12.0%, preferably about 2%, of the weight of the cereal product is incorporated substantially homogeneously in said product in order to prevent or retard the formation of bitter substances from the oats.

It has proved that cocoanut oil acts as a positive protection against the formation of bitter substances from oats. We have not hitherto ascertained whether the favorable action of the cocoanut oil in this connection depends on its percentage of glycerides of low-molecular fatty acids, on some substance or substances of any other nature than the glycerides or on the particular proportion of the components of this kind of fat. By the invention it will, however, be possible to produce, for example, toasted oat-flakes, oat-biscuits and similar foods with long storage life also under very unfavorable storing conditions.

In carrying out the present process, we proceed suitably in such a manner that in the dough, from which oat-biscuits or oat-flakes are prepared, cocoanut-oil is mixed in a quantity corresponding to 0.1–12.0% of the quantity of the cereals, a considerable portion of which consists of oats. The biscuits or flakes formed from the dough, if desired after addition of taste substances, may then be baked, dried and/or toasted. The quantity of salt suitable for the taste may be added either in the dough or also the food may be salted externally in the manner described in the American patent specification No. 2,093,260. When, however, according to the invention, cocoanut oil is added in the production of baked and/or toasted oat-products, a good storage life is obtained also if the common salt is incorporated in the product.

In the production of toasted oat-flakes it is also possible to increase the storage life of the flakes in a high degree by the aid of cocoanut oil which in this case is preferably added to the dough, from which the flakes are formed, when the dough is kneaded. Also in this case as well as in the production of oat biscuits and other baked and/or toasted oat-products, with good result the finished product, such as oat-flakes, oat-biscuits, in suitable way may be impregnated with cocoanut oil, or the cocoanut oil may in advance be added to any of the raw products used, as for instance to the oat-flour or rolled oats.

If one tries to produce toasted oat flakes according to known processes used in the production, for example, of maize-flakes, barley-flakes or wheat-flakes, i. e. by heat treatment of cereal grains with a sauce containing, among other things, common salt, sugar and other taste substances, and then dries, extrudes and toasts the flakes obtained, these flakes, if produced from oat-grains, after a short time will be inedible due to the formation of the bitter substances above mentioned. If, however, some cocoanut oil is incorporated either together with the taste substances or in the finished flakes, their storage life will be considerably increased.

What we claim is:

1. A process of producing a baked cereal product having a long storage life and containing a considerable proportion of oats consisting in incorporating cocoanut oil in a quantity of 0.1–12.0% of the weight of the cereal product substantially homogeneously in said product for retarding the formation of bitter substances in said oats.

2. A process as claimed in claim 1 in which the cocoanut oil is added to dough from which the baked cereal product is prepared.

3. A process as claimed in claim 1 in which the cocoanut oil is added to at least one of the ingredients of the dough from which the baked cereal product is produced prior to introduction of the ingredient in the dough mixture.

4. A process as claimed in claim 1 in which the cocoanut oil is incorporated in the baked product by impregnating the same with the cocoanut oil.

5. A process as claimed in claim 1 in which the cocoanut oil is incorporated in a quantity of about 2% of the weight of the cereal product.

References Cited in the file of this patent

UNITED STATES PATENTS

| | | |
|---|---|---|
| 1,047,013 | Ellis | Dec. 10, 1912 |
| 1,372,615 | Ellis | Mar. 22, 1921 |
| 1,424,927 | Luft | Aug. 8, 1922 |
| 1,446,004 | Ellis | Feb. 20, 1923 |
| 1,705,034 | Smith et al. | Mar. 12, 1929 |
| 1,710,403 | Chamberlain | Apr. 23, 1929 |
| 1,895,166 | Laymon | Jan. 24, 1933 |
| 2,069,265 | Musher | Feb. 2, 1937 |

OTHER REFERENCES

"Keeping Quality of Crackers Improved by Antioxygen" (Triebold), Food Industry, vol. 10, February 1938, pp. 71, 111–112.

"Stabilization of Fats and Fatty Foods" (Mitchell and Black), Ind. Eng. Chem., vol. 35, January 1943, pp. 50–52.

"Everybody's Cook Book," 1924, by Lord. Publ. by Henry Holt and Co. (N. Y.), pp. 79, 158, 162, 163, 167.